Sept. 8, 1959 J. WOLLENHAUPT 2,902,891
BORING UNIT
Filed Nov. 2, 1955 6 Sheets-Sheet 1
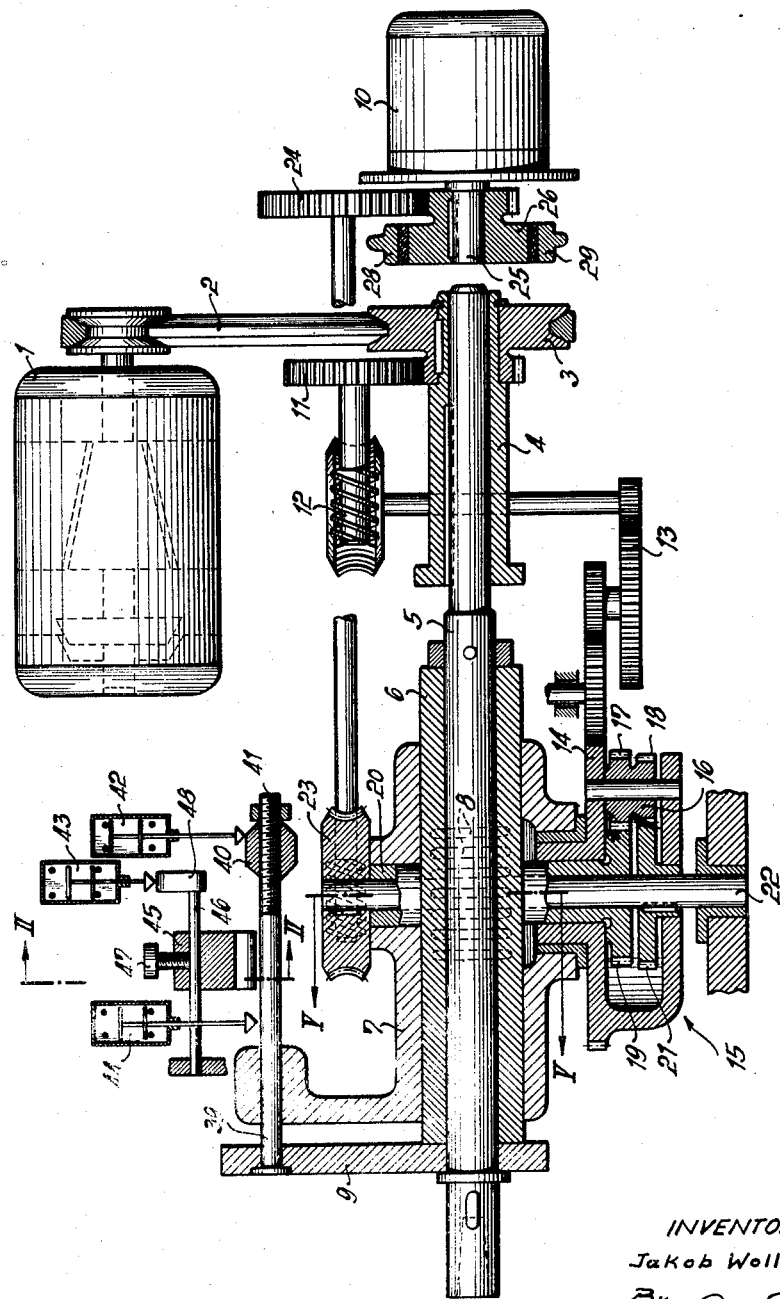
INVENTOR
Jakob Wollenhaupt
By *Walter Becker*
Patent Agent

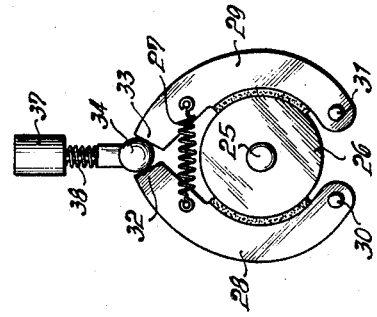
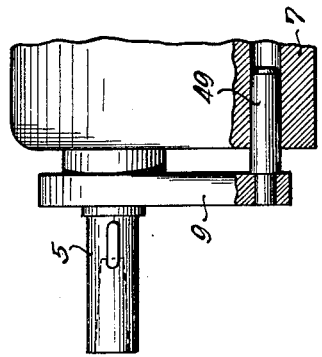
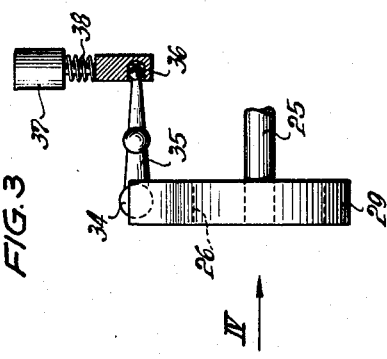
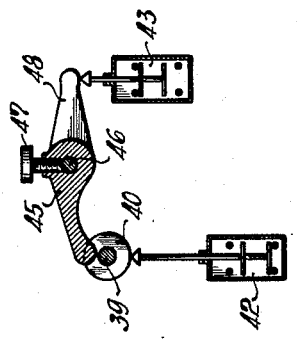
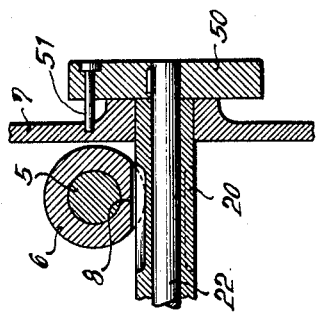

Sept. 8, 1959 J. WOLLENHAUPT 2,902,891
BORING UNIT
Filed Nov. 2, 1955 6 Sheets-Sheet 4
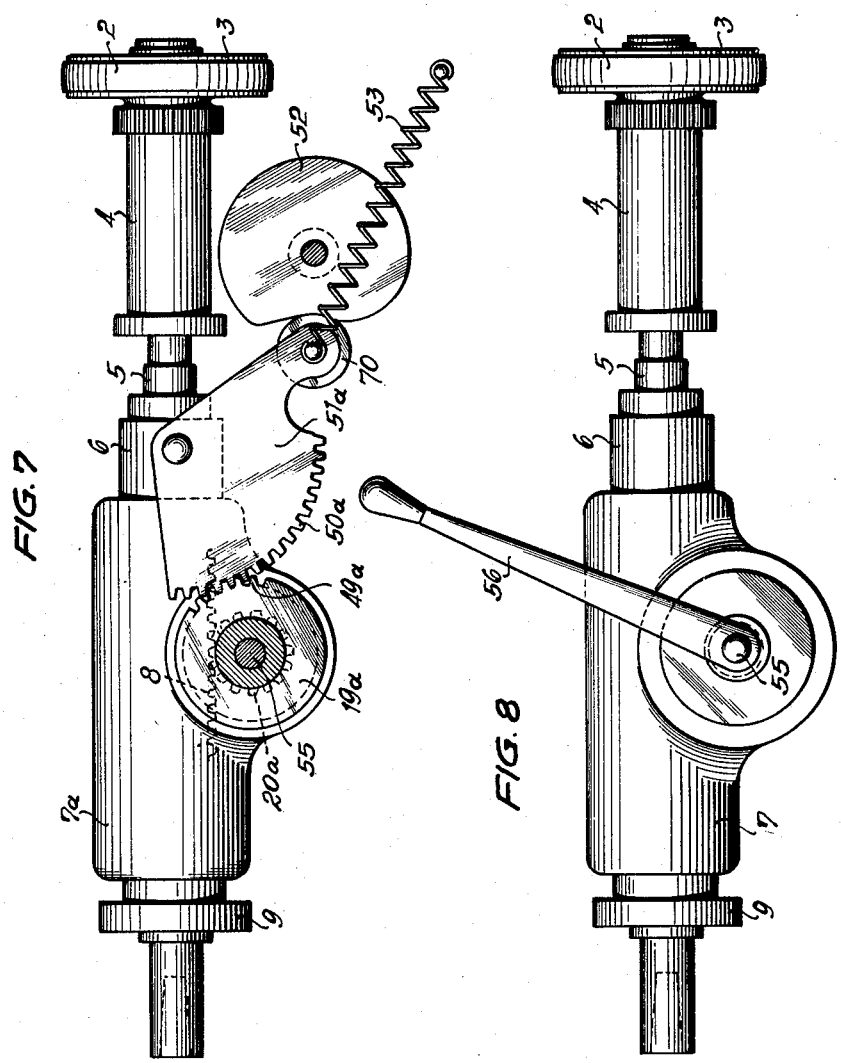
INVENTOR
Jakob Wollenhaupt
By
Patent Agent

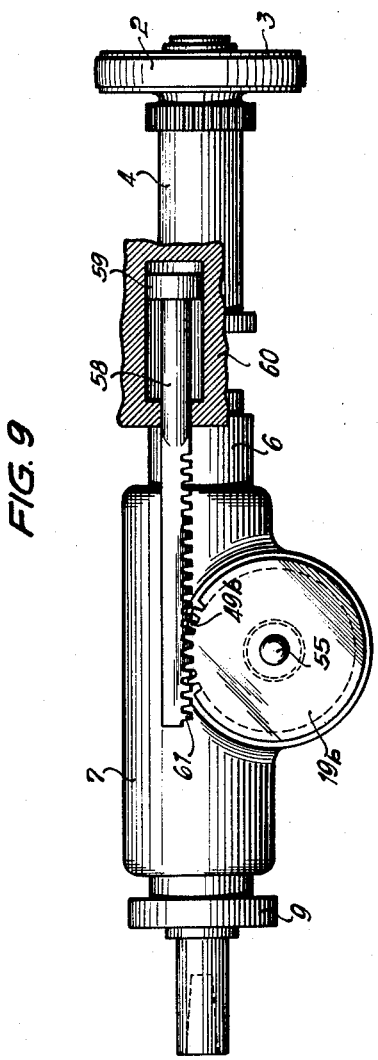

Sept. 8, 1959  J. WOLLENHAUPT  2,902,891
BORING UNIT
Filed Nov. 2, 1955  6 Sheets-Sheet 6
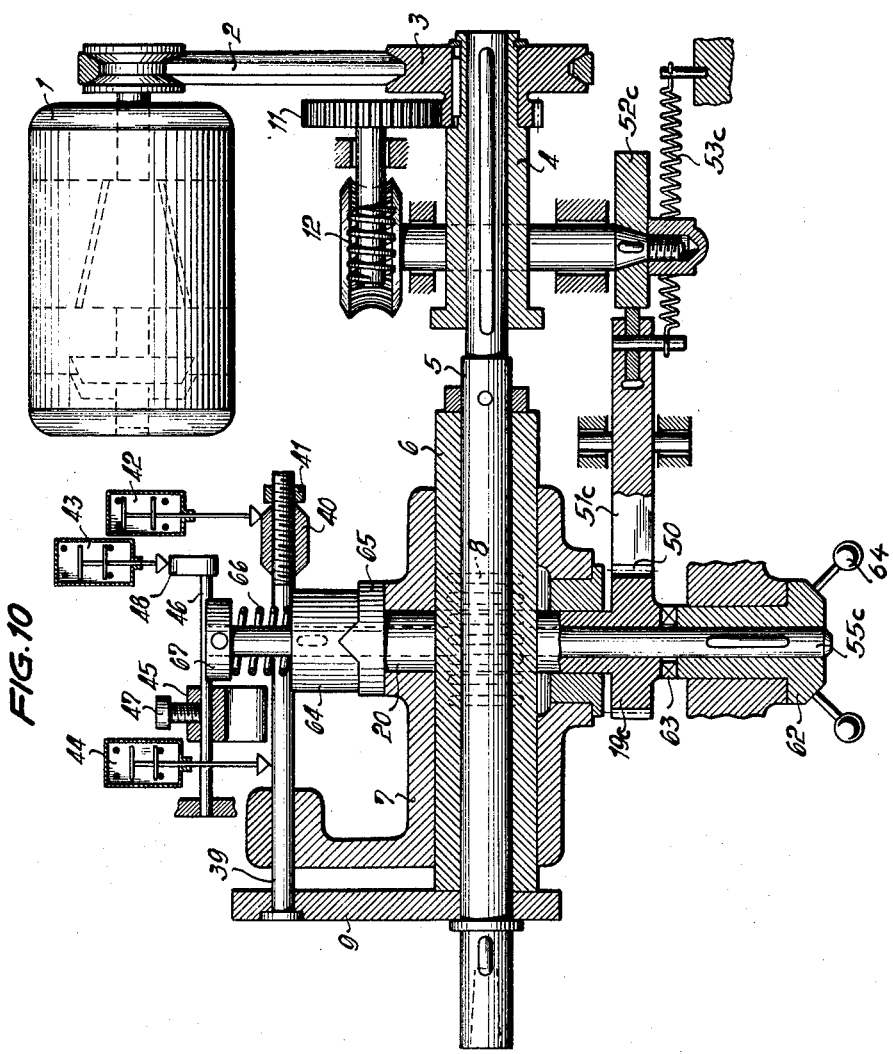
INVENTOR
Jakob Wollenhaupt

United States Patent Office 2,902,891
Patented Sept. 8, 1959

2,902,891

BORING UNIT

Jakob Wollenhaupt, Koln-Bruck, Germany, assignor to Gebrüder Honsberg, Renscheid-Hasten, Germany Application November 2, 1955, Serial No. 544,459

Claims priority, application Germany November 4, 1954

10 Claims. (Cl. 77—34.6)

The present invention relates to boring machines, especially boring units for boring and tapping.

With boring machines and boring units, the working spindle is usually mounted in a spindle sleeve movable in feed direction or on a displaceable carriage. The feed of the working spindle is produced by a pinion which meshes with a rack arranged on the spindle sleeve or on the carriage, said pinion being driven in conformity with the speed of rotation of the working spindle. With known machines, the drive of the pinion is effected by a bevel gear-planetary gear transmission into which, in addition to the feed derived from the working spindle speed, also a fast traverse movement can be introduced which is independent of the working spindle speed and is produced by a separate fast traverse motor. The feed drive derived from the working spindle must be greatly reduced. With heretofore known machines this is brought about by a greater number of gear and worm transmissions which either precede or follow the planetary gear transmission.

It is an object of the present invention to simplify the construction of the above mentioned boring machines and boring units, especially to reduce the number of transmissions heretofore required with such machines and units.

It is a further object of this invention to provide a boring unit which will have a considerably better mechanical degrees of efficiency and working precision than heretofore known boring units of the above mentioned type.

It is still another object of this invention to provide a more flexible boring unit of the above mentioned type which will be better adapted to the individual working conditions.

A still further object of this invention consists in the provision of a boring unit which may be controlled automatically in a manner known per se and which without requiring a reconstruction and while employing the same receiving bores in the casing can easily be used and adjusted for cam feed, manual feed, hydraulic feed and also feed by a planetary gear transmission.

These and other objects and advantages of the invention will appear more clearly from the following specification in connection with the accompanying drawings, in which:

Fig. 2 is a partial section taken along the line II—II of Fig. 1.

Fig. 3 is a side view of the brake of the fast transverse motor.

Fig. 4 is a view seen in the direction of the arrow C in Fig. 3.

Fig. 5 is a modification of the section taken along the line V—V of Fig. 1.

Fig. 6 is a partial view of a modified boring machine showing that end which is adjacent the tool.

Fig. 7 illustrates a cam controlled feed for installing in a boring unit with planetary gear block according to Fig. 1.

Fig. 8 shows a manual control for the above mentioned unit.

Fig. 9 is a hydraulic feed control.

Fig. 10 illustrates how the cam control feed according to Fig. 7 may be combined with manual control.

General arrangement

Figure 1A:
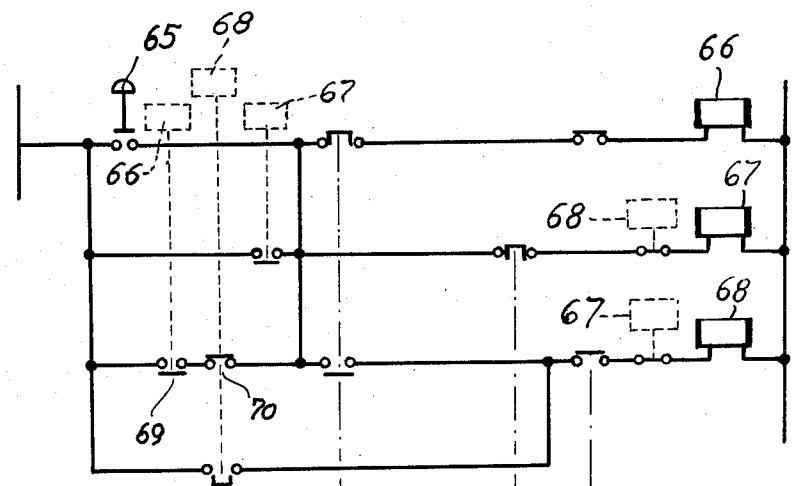
Fig. 1 illustrates a section through the driving and controlling means of the boring machine, some of the elements being shown as having been moved from their natural plane into the drawing plane to simplify the illustration.

According to the present invention, the planetary gear transmission built up in a manner known per se from spur gear is provided with a two-wheel planetary gear block which is journalled in a carrier driven by the working spindle through the intervention of change gears. The number of gears of the two wheels of the planetary gear block differ only slightly from each other in conformity with the invention and each of said wheels meshes with one sun wheel respectively. One of these sun wheels drives the pinion which conveys the feed to the spindle sleeve or the boring carriage, whereas the other sun wheel may be driven by the fast traverse motor.

This arrangement of the spur gear-planetary gear transmission, according to the invention, yields a feed drive with fast traverse movement of a simplicity which has not been obtained heretofore. The transmission of the boring machine according to the invention brings about a super-position of the feed and fast traverse transmission and also brings about the required great reduction of the feed drive, whereby a number of transmissions is saved. For purposes of changing the feed per revolution of the working spindle, it is merely necessary to bring the respective change gears into mesh with each other. In order to prevent the two drives through the planetary gear transmissions from affecting each other, two self-locking worm gears are respectively arranged in the conveying means for conveying the feed movement and the fast traverse movement to the planetary gear transmission. More specifically, the fast traverse motor is provided with a brake which becomes effective when the said fast traverse motor is switched off, whereby the shifting over from fast traverse to feed can be precisely fixed. This brake is expediently designed as an external shoe brake with two brake shoes rotatably arranged alongside each other. The two brake shoes are contracted by a tension spring so that they will have the same bearing pressure. A ball-shaped head forming one end of a two-arm lever extends between the free ends of the two brake shoes, whereas the other end of said two-arm lever is adapted in response to the energization of an electromagnet arranged in series with said fast traverse motor to release said brake against the thrust of said spring.

A normal slide armature motor will suffice for switching off the main drive motor of the boring machine at a desired time because the reduction between the motor and the pinion for the feed drive is rather high.

With boring machines or boring units in which the boring spindle is mounted in a spindle sleeve and is axially displaced together with the latter, a one-arm lever is nonrotatably connected to that end of the spindle sleeve which is adjacent the tool. A control rod journalled in the casing is connected to said one-arm lever, said control rod being eccentrically located with regard to the axis of the working spindle. This control rod prevents the spindle sleeve from rotating and is adapted to actuate three switches by means of a control cam beveled on both sides and connected to said control rod. The two outer switches determine the two end positions of the working spindle, whereas the intermediate switch is adapted to bring about the shift-over from fast traverse forward to feed forward. The total width of the control cam and the width of the lever contacted by the cam and actuating the intermediate switch corresponds to the maximum possible feed distance. The intermediate switch is then actuated during the entire stroke at feed speed, so that an undesired shift-over to fast traverse speed will not be possible during the feed stroke. The feed cam is axially adjustable on the control rod. If desired, individual or all switches or the actuating members therefor may likewise be axially adjustably arranged. The lever at that end of the spindle sleeve which is adjacent the tool may be so designed that it can simultaneously serve as boring head carrier for mounting multiple spindle boring heads. In this instance the working spindle may be designed without receiving cone and will act as follower only. When boring heads or other additional devices are attached, the lever on the spindle sleeve is provided with an additional boring head guide which consists of a cylindrical guiding rod connected to said lever and journalled in the casing.

With the heretofore known mechanical boring units, the feed movement is brought about by a cam. This cam has a steep ascent for the in-feed and has a steep descent for the fast traverse backward movement. With the known devices, the working step is made effective by a manually operable lever or by push button if a plurality of units are simultaneously to be controlled. The return of the spindle is effected by tension springs. The advantage of such cam drive consists primarily in its relatively low cost. However, its range of application is greatly limited by the fact that such cam controlled feed allows a short feed stroke only. In actual practice, with heretofore known boring units the feeding strokes vary generally from 50 to 70 millimeters. Moreover, the ratio between feed and fast traverse speed is unfavorable since the steepness of the feed cam cannot be selected at random. Therefore, in most instances in addition to boring units with cam controlled feed also boring units with hydraulically controlled feed are constructed. These units allow a greater feed stroke and also a control which is independent of the stroke.

The boring unit according to the present invention may in a manner known per se be controlled automatically and without requiring any redesign, i.e. while employing the same receiving bores in the casing, the boring unit according to the invention may easily be adapted to cam controlled feed, manual feed, hydraulic feed, and also to the feed by a planetary gear transmission with a two-wheel planetary gear block as referred to above. This variety of possibilities is materialized by the fact that the drive of the pinion which meshes with the rack on the spindle sleeve or the boring carriage and which pinion is driven in conformity with the speed of the working spindle, may be effected selectively through a spur gear-planetary gear transmission, through a cam controlled feed, or through a hydraulic drive. To this end it is merely necessary to adapt the member driving the said pinion to the respective drive while the same casing and the same casing borings are maintained.

In this way a boring unit is obtained which is characterized not only by a particularly simple design saving a great number of transmissions, but also by the fact that following the initiation of the working step, the control is effected automatically and the boring unit can be adapted to each of the above mentioned feed types without requiring a redesign of the casing of the unit. Depending on which feed type is desired, it is merely necessary to exchange the transmission between the pinion for driving the spindle sleeve and the drive. In order to be able to take in all control possibilities, the unit is so designed that the drive of the feed can also be effected by means of a manually operable lever. With the various drive types for the feed, the elements of the respective feed drive are in conformity with the present invention so designed that they can be used for driving the pinion which meshes with the rack of the spindle sleeve.

*Structural arrangement*

Referring now to the drawings in detail and Figs. 1 to 6 thereof in particular, the arrangement shown therein comprises a main drive motor 1, which may be designed as a slide armature motor, and which drives the working spindle 5 through the intervention of the V-belt 2, the V-belt pulley 3 and the sleeve 4. The working spindle 5 is rotatably journalled in the spindle sleeve 6. The spindle sleeve in its turn is axially displaceably mounted in the casing 7 and is designed as rack 8. At that end of the spindle sleeve which is adjacent the tool, a one-arm lever 9 is non-rotatably connected to the spindle sleeve 6.

The V-belt pulley 3 drives the carrier 14 for the spur gear-planetary gear transmission generally designated 15. This is effected through a gear 11, a worm wheel 12 and change gears 13. A two-wheel planetary gear block 16 is journalled in the carrier 14. The teeth of both wheels 17 and 18 differ only slightly in number from each other. The wheel 17 meshes with a sun wheel 19 having an extended shaft 20 designed as a pinion which meshes with the rack 8 of the spindle sleeve 6. The gear 18 of the planetary gear block 16 meshes with a sun wheel 21 which through a shaft 22, a worm gear transmission 23 and a gear 24 is driven by the fast traverse motor 10.

A brake drum 26 is mounted on the shaft 25. Two brake shoes 28 and 29 (Fig. 4) are pressed by a tension spring 27 against the brake drum 26, said brake shoes being tiltably journalled at 30 and 31 respectively. The two-arm lever 35 (Fig. 3) has one end provided with a ball-shaped head 34 which extends between the two brake shoes 28 and 29, whereas the other free end 36 of said lever 35 is arranged for actuation by an electromagnet 37 arranged in series with the fast traverse motor 10. When the electromagnet 37 is energized, it pulls the lever end 36 upwardly against the thrust of the spring 38 so that the ball-shaped head 34 will be pressed between the free ends 32 and 33 of the brake shoes 28 and 29 thereby lifting the same off the brake drum 26 so that the brake is disengaged. Connected to the lever 9 and eccentrically arranged with regard to the axis of the working spindle 5 is a control rod 39 (Fig. 1) provided with a control cam 40 beveled at both sides. This control cam is screwed to a thread on the control rod 39 and held in its respective position by a counter nut 41. The control cam 40 is adapted to actuate the switches 42, 43 and 44. The actuation of the intermediate switch 43 is effected by a lever 45. This lever 45 is axially adjustable on a shaft 46 mounted in the casing and may be held in any desired axial position on shaft 46 by means of a set screw 47. The shaft 46 carries a second lever 48 adapted to actuate the switch 43. The switch 42 is adapted to stop the entire drive when the rear end position of the working spindle has been reached. The switch 43, when moving toward the work piece, brings about the shift-over from fast traverse to feed speed. The switch 44 either stops the entire drive or initiates the return movement when the front end position of the working spindle has been reached. The total width of the control cam 40 and the lever 45 must correspond to the maximum feed stroke which can be obtained with the machine. The switch 43 is actuated during the entire feed stroke.

The lever 9 may simultaneously be designed as a boring head carrier. As will be seen from Fig. 6, in such an instance the lever 9 is provided with an additional boring head guide consisting of a cylindrical guiding rod 49 connected to the lever 9 and journalled in the casing 7.

In some instances, for instance when tapping in light metal, a fast traverse speed will be superfluous. For this purpose, the boring machine according to the invention may without other changes be simplified by not driving the sun wheel 21 of the planetary gear transmission 15. Instead of the worm wheel of the worm gear transmission 23, a disc 50 (Fig. 5) is mounted on the end of shaft 22 and keyed thereto, said disc 50 being secured against rotation by means of a pin 51 engaging casing 7.

Fig. 7 shows the feed drive by means of a cam. The pinion 19a on shaft 55 is drivingly connected through gear 20 with the rack 8 of the spindle sleeve 6 in casing 7a and has teeth 49a which mesh with the teeth 50a of a rocker segment 51a which latter is adapted to be actuated by a cam 52 through a roller 70 carried by segment 51a. The spindle return is effected by a retraction spring 53.

For purposes of completeness, manual feed drive is shown in Fig. 8 and is effected by a manually operable lever 56 connected to the shaft 55.

According to the arrangement shown in Fig. 9, the pinion 19b is adapted to be driven by the piston rod 58 of a fluid operable piston 59 which latter is reciprocably mounted in a cylinder 60. The piston rod 58 is provided with teeth 61 forming a rack which mesh with the teeth 49b of the pinion 19b.

Figure 1A:
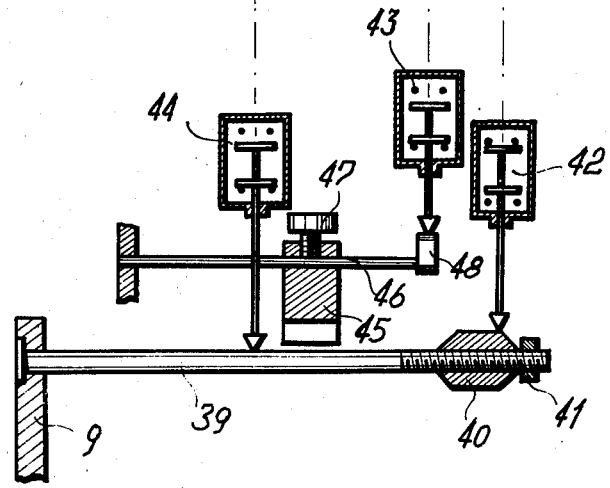

Fig. 10 is a section through a boring unit similar to that of Fig. 1 but is additionally provided with means which make it possible to control the feed drive selectively by a cam or by a handwheel. The cam feed shown at the right-hand lower portion of the drawing corresponds to the design shown in Fig. 7. The cam is designated with the numeral 52c, while the return spring is designated with the numeral 53c. The rocker segment 51c has its teeth in engagement with the pinion 19c. The handwheel 64 is connected to a sleeve 62 fixedly connected to the shaft 55c and provided with jaws 63 which engage corresponding jaws of the pinion 19c and together therewith form a jaw clutch. By disengaging the jaws of the sleeve 62 from the jaws of the pinion 19c, the cam drive becomes ineffective and the spindle sleeve may now be actuated manually by actuation of the handwheel 64. This permits a simple adjustment in longitudinal direction of the effectiveness of the cam automatics. The arrangement according to the invention also allows the adjustment of longer strokes than is possible with the heretofore boring units equipped with cam feed control.

It is, of course, understood that the present invention is, by no means, limited to the particular constructions shown in the drawings but also comprises any modifications within the scope of the appended claims.

Fig. 1a shows the diagram of connection of the switches 42—44 and motors 1 and 10.

Switching is effected as follows:

(1) Drive motor 1 is switched by means of pushbutton 65 in connection with relay 66, and fast traverse motor 10 is switched (right hand turn) in connection of relay 67 by means of a switch 69 (fast traverse forward).

(2) Fast traverse motor 10 is switched off by the intermediate switch 43.

(3) When spindle 5 has reached the end position, fast traverse motor 10 is commutated to left hand turn by means of relay 68. Relay 68 switches off drive motor 1 by means of a switch 70 (fast traverse backward movement into base position).

(4) In base position the circuit system is switched off by means of switch 42.

What I claim is:

1. In a boring unit for boring and tapping: a working spindle, a planetary gear transmission including a two-wheel planetary gear block with a first planetary gear and a second planetary gear and also including a first sun wheel meshing with said first planetary gear and a second sun wheel meshing with said second planetary gear, a planetary gear carrier carrying said first and second planetary gears, a main motor drivingly connected to said working spindle for rotating the same, power conveying means drivingly connecting said working spindle with said planetary gear carrier for rotating the same, gear means drivingly interconnecting said first sun wheel with said working spindle to feed said working spindle, and a fast traverse motor independent of said main motor and drivingly connected to said second sun wheel for conveying increased speed through the latter and said second planetary gear to said first planetary gear.

2. A boring unit according to claim 1, in which the number of teeth of said first and second planetary gears differ only slightly from each other.

3. In a boring unit for boring and tapping: a working spindle, a planetary gear transmission including a two-wheel planetary gear block with a first planetary gear and a second planetary gear and also including a first sun wheel meshing with said first planetary gear and a second sun wheel meshing with said second planetary gear, a planetary gear carrier carrying said first and second planetary gears, a main motor drivingly connected to said working spindle for rotating the same, power conveying means including a first self-locking worm gear transmission and drivingly connecting said working spindle with said planetary gear carrier for rotating the same, gear means drivingly interconnecting said first sun wheel with said working spindle to feed said working spindle, a fast traverse motor independent of said main motor, and a second self-locking worm gear transmission drivingly interconnecting said fast traverse motor with said second sun wheel for conveying increased speed through the latter and said second planetary gear to said first planetary gear.

4. In a boring unit for boring and tapping: a working spindle, a planetary gear transmission including a two-wheel planetary gear block with a first planetary gear and a second planetary gear and also including a first sun wheel meshing with said first planetary gear and a second sun wheel meshing with said second planetary gear, a planetary gear carrier carrying said first and second planetary gears, a main motor drivingly connected to said working spindle for rotating the same, power conveying means including a first self-locking worm gear transmission and drivingly connecting said working spindle with said planetary gear carrier for rotating the same, gear means drivingly interconnecting said first sun wheel with said working spindle to feed said working spindle, a fast traverse motor independent of said main motor, a second self-locking worm gear transmission drivingly interconnecting said fast traverse motor with said second sun wheel for conveying increased speed through the latter and said second planetary gear to said first planetary gear, switch means operable selectively to admit or interrupt power to said fast traverse motor for driving and stopping said motor respectively, and brake means responsive to the interruption of power to said fast traverse motor for braking the latter.

5. A boring unit according to claim 4, in which said brake means includes a brake drum rotatably connected to said fast traverse motor and also includes brake shoes and spring means continuously urging said brake shoes into engagement with said brake drum, electromagnetic means arranged in series with said fast traverse motor and including means operable in response to the energization of said electromagnetic means to lift said brake shoes off said brake drum against the thrust of said spring means and to move into ineffective position in response to the de-energization of said electromagnetic means thereby permitting said spring means to move said brake shoes into braking engagement with said brake drum.

6. In a boring unit for boring and tapping including a main motor and a fast traverse motor independent of said main motor: a frame, a spindle sleeve axially slidably mounted in said frame, a working spindle fixedly connected to said spindle sleeve for reciprocation therewith, said main motor being drivingly connected to one end of said working spindle, lever means arranged adjacent the other end of said working spindle and fixedly connected to said spindle sleeve, control shaft means supported by said lever means and arranged eccentrically with regard to said working spindle, control cam means having a plurality of cam surfaces and being supported by said control shaft means, a first control switch operable by said cam means in response to said working spindle reaching its rear end position for interrupting the drive of said working spindle, a second control switch arranged for cooperation with said cam means and adapted in response to said working spindle reaching its front end position selectively to reverse the feed movement of said working spindle or to interrupt the drive of said working spindle, a third control switch arranged for cooperation with said cam means and adapted in response to said working spindle reaching a certain position during its movement toward the work piece to make said fast traverse motor ineffective for shifting from fast traverse to feed speed, a planetary gear transmission including a two-wheel planetary gear block with a first planetary gear and a second planetary gear and also including a first sun wheel meshing with said first planetary gear and a second sun wheel meshing with said second planetary gear, a planetary gear carrier carrying said first and second planetary gears, power conveying means drivingly connecting said working spindle with said planetary gear carrier for rotating the same, gear means drivingly interconnecting said first sun wheel with said working spindle to feed said working spindle, and means arranged for drivingly connecting said second sun wheel with said fast traverse motor for conveying increased speed through said sun wheel and said second planetary gear to said first planetary gear.

7. A boring unit according to claim 6, in which said control cam means is adjustably mounted on said control shaft means.

8. A boring unit according to claim 6, which includes lever means operable by said cam means for actuating said third control switch, the total of the width of said last mentioned lever means and the width of said cam means substantially totaling the maximum possible feed stroke.

9. In a boring unit for boring and tapping including a main motor and a fast traverse motor independent of said main motor: a frame, a spindle sleeve axially slidably mounted in said frame, a working spindle fixedly connected to said spindle sleeve for reciprocation therewith, said main motor being drivingly connected to one end of said working spindle, lever means arranged adjacent the other end of said working spindle and fixedly connected to said spindle sleeve, control shaft means supported by said lever means and arranged eccentrically with regard to said working spindle, control cam means having a plurality of cam surfaces and being supported by said control shaft means, a plurality of switch means arranged to be controlled by said cam means for respectively controlling the feed and fast traverse movements of said working spindle, said lever means being designed as boring head carrier for supporting multiple spindle heads, a guiding rod connected to said lever means and guided in said frame, a planetary gear transmission including a two-wheel planetary gear block with a first planetary gear and a second planetary gear and also including a first sun wheel meshing with said first planetary gear and a second sun wheel meshing with said second planetary gear, a planetary gear carrier carrying said first and second planetary gears, power conveying means drivingly connecting said working spindle with said planetary gear carrier for rotating the same, gear means drivingly interconnecting said first sun wheel with said working spindle to feed said working spindle, and means arranged for drivingly connecting said second sun wheel with said fast traverse motor for conveying increased speed through said sun wheel and said second planetary gear to said first planetary gear.

10. In a boring unit for boring and tapping: a working spindle; a motor drivingly connected to said spindle for rotating the same; a cam drivingly connected to said motor; and power conveying means drivingly connecting said cam to said working spindle for feeding the same, said power conveying means including a rack connected to said working spindle, a first pinion meshing with said rack, a tiltably supported gear segment, a roller carried by said gear segment and operable by said cam for tilting said gear segment, a second pinion meshing with said gear segment, a shaft rotatably connected to said first and second pinions and a manually operable member keyed to said shaft and provided with clutch means operable selectively to establish or interrupt driving connection between said shaft and said second pinion.

References Cited in the file of this patent

UNITED STATES PATENTS

| 1,074,906 | Sosa | Oct. 7, 1913 |
| 1,822,692 | De Leeuw | Sept. 8, 1931 |
| 1,865,375 | Kingsbury | June 28, 1932 |
| 2,167,673 | Oberhoffken | Aug. 1, 1939 |

FOREIGN PATENTS

| 343,266 | Great Britain | Feb. 19, 1931 |